(12) United States Patent
Chen et al.

(10) Patent No.: US 10,786,866 B2
(45) Date of Patent: Sep. 29, 2020

(54) INSPECTING AND REPAIRING DEVICE OF ADDITIVE MANUFACTURING TECHNOLOGY AND METHOD THEREOF

(71) Applicant: TONGTAI MACHINE & TOOL CO., LTD., Kaohsiung (TW)

(72) Inventors: Yi-Hsien Chen, Kaohsiung (TW); Hsin-Pao Chen, Kaohsiung (TW); Jui-Hsiung Yen, Kaohsiung (TW)

(73) Assignee: TONGTAI MACHINE & TOOL CO., LTD., Kaohsiung (TW)

( * ) Notice: Subject to any disclaimer, the term of this patent is extended or adjusted under 35 U.S.C. 154(b) by 295 days.

(21) Appl. No.: 15/796,065

(22) Filed: Oct. 27, 2017

(65) Prior Publication Data

US 2018/0126487 A1 May 10, 2018

(30) Foreign Application Priority Data

Nov. 7, 2016 (CN) .......................... 2016 1 0971035

(51) Int. Cl.

| | |
|---|---|
| *B23K 26/03* | (2006.01) |
| *B33Y 30/00* | (2015.01) |
| *B29C 64/188* | (2017.01) |
| *B22F 3/105* | (2006.01) |
| *B29C 64/153* | (2017.01) |

(Continued)

(52) U.S. Cl.
CPC .......... *B23K 26/032* (2013.01); *B22F 3/1055* (2013.01); *B29C 64/153* (2017.08); *B29C 64/188* (2017.08); *B29C 64/227* (2017.08); *B29C 64/245* (2017.08); *B29C 64/268* (2017.08); *B29C 64/393* (2017.08); *B29C 73/24* (2013.01); *B33Y 30/00* (2014.12); *B22F 2003/1057* (2013.01); *B29C 2035/0838* (2013.01); *B29C 2793/00* (2013.01); *B29C 2793/009* (2013.01); *B33Y 10/00* (2014.12); *B33Y 50/02* (2014.12)

(58) Field of Classification Search
CPC ...... B29C 64/227; B29C 64/268; B29C 73/24
See application file for complete search history.

(56) References Cited

U.S. PATENT DOCUMENTS

| | | | |
|---|---|---|---|
| 5,897,944 | A | 4/1999 | Loercks et al. |
| 6,204,622 | B1 | 3/2001 | Tsuruta |

(Continued)

FOREIGN PATENT DOCUMENTS

| | | |
|---|---|---|
| CN | 1067093 C | 6/2001 |
| CN | 1107251 C | 4/2003 |

(Continued)

*Primary Examiner* — Jacob T Minskey
*Assistant Examiner* — Virak Nguon

(57) ABSTRACT

An inspecting and repairing device of additive manufacturing technology and a method thereof are provided. The inspecting and repairing device has a powder bed unit, a repairing unit, and an inspection unit. The powder bed unit has a powder platform, a powder spreading mechanism and a laser unit. The repairing unit has a processing mechanism. The inspection unit has a camera and a controller. According to an image of the powder platform captured by the camera, the controller can determine whether spreading powders, whether being overcome a powder spreading defect, or whether driving the processing mechanism to repair a surface of a workpiece.

10 Claims, 6 Drawing Sheets

US 10,786,866 B2
Page 2

(51) Int. Cl.
  *B29C 64/245* (2017.01)
  *B29C 64/393* (2017.01)
  *B29C 64/227* (2017.01)
  *B29C 64/268* (2017.01)
  *B29C 73/24* (2006.01)
  *B33Y 10/00* (2015.01)
  *B33Y 50/02* (2015.01)
  *B29C 35/08* (2006.01)

(56) References Cited

U.S. PATENT DOCUMENTS

| | | | |
|---|---|---|---|
| 9,519,275 | B2 | 12/2016 | Yamamoto |
| 2009/0057275 | A1 | 3/2009 | Chen et al. |
| 2013/0337161 | A1 | 12/2013 | Akimoto et al. |
| 2015/0177158 | A1 | 6/2015 | Cheverton |
| 2016/0018320 | A1* | 1/2016 | Hess ............... G01N 21/35 702/81 |
| 2016/0129633 | A1 | 5/2016 | Huang |
| 2016/0184893 | A1 | 6/2016 | Dave et al. |
| 2016/0200042 | A1 | 7/2016 | Jeng et al. |
| 2016/0325541 | A1 | 11/2016 | Lavrentyev et al. |
| 2017/0144248 | A1 | 5/2017 | Yoshimura et al. |
| 2017/0146489 | A1* | 5/2017 | Redding ............... B33Y 50/02 |
| 2017/0312821 | A1* | 11/2017 | DeFelice ............... B22F 3/1055 |
| 2017/0348904 | A1* | 12/2017 | Chang ............... B33Y 10/00 |
| 2018/0071987 | A1 | 3/2018 | Tsumuraya et al. |
| 2019/0054704 | A1 | 2/2019 | Goto |
| 2019/0184631 | A1* | 6/2019 | Bauza ............... B33Y 10/00 |

FOREIGN PATENT DOCUMENTS

| | | |
|---|---|---|
| CN | 1294464 C | 1/2007 |
| CN | 1296785 C | 1/2007 |
| CN | 104907562 A | 9/2015 |
| CN | 103797429 B | 3/2016 |
| CN | 105522155 A | 4/2016 |
| CN | 105643921 A | 6/2016 |
| CN | 106003726 A | 10/2016 |
| CN | 106041076 A | 10/2016 |
| FR | 3021569 A1 | 12/2015 |
| JP | 2002254408 A | 9/2002 |
| JP | 2003245981 A | 9/2003 |
| JP | 2009056511 A | 3/2009 |
| JP | 2015112752 A | 6/2015 |
| TW | 201240822 A | 10/2012 |
| TW | 201625720 A | 7/2016 |
| WO | 2015109096 A1 | 7/2015 |
| WO | 2015151865 A1 | 10/2015 |
| WO | 2016143137 A1 | 9/2016 |

* cited by examiner

INSPECTING AND REPAIRING DEVICE OF ADDITIVE MANUFACTURING TECHNOLOGY AND METHOD THEREOF

FIELD OF THE INVENTION

The present disclosure relates to an inspecting and repairing device and an inspecting and repairing method, and in particular to an inspecting and repairing device of an additive manufacturing technology and an inspecting and repairing method thereof.

BACKGROUND OF THE INVENTION

Laminated object manufacturing, also called additive manufacturing (AM) technology, is provided to capture a plurality of two-dimensional layered contours from a three-dimensional model, and manufacture a workpiece by laminating according to the two-dimensional layered contours.

The current laminated object manufacturing is predominantly based on laser laminate manufacturing technology. A laser melting method is adopted, and a powder layer is spread by a powder spreading mechanism according to the two-dimensional layered contours of the three-dimensional model. The laser beam is focused on the powder layer to melt powders to form the two-dimensional layered contour, and the workpiece is laminated.

During the laminated manufacturing process, the quality of the workpiece will be affected by factors, such as power of the laser, flow field of the gas, and quality of the powders, so that it causes defects of the powder layer. For example, state of spreading powders is incomplete, warped state, raised state, and depressed state. However, equipment of the laser laminate manufacturing technology lacks the mechanism to correct above defects so that the yield rate of the workpiece cannot be increased and the quality of the workpiece cannot be improved.

As a result, it is necessary to provide an inspecting and repairing device of an additive manufacturing technology and a method thereof to solve the problems existing in the conventional technologies as described above.

SUMMARY OF THE INVENTION

An object of the present disclosure is to provide an inspecting and repairing method of an additive manufacturing technology, which can inspect the post-spreading image and the post-fusion image, determine various types of the defects effectively, and improve the quality of workpiece.

Another object of the present disclosure is to provide an inspecting and repairing device of additive manufacturing technology, which can inspect a powder platform by camera, and repair workpiece by a repairing unit so that the yield rate of workpiece can be increased.

To achieve the above objects, the present disclosure provides an inspecting and repairing method of an additive manufacturing technology for inspecting and repairing a workpiece formed by the additive manufacturing technology, which comprises a powder spreading step, a fusing step, a fusion inspecting step, and a fusion repairing step, wherein the powder spreading step is spreading powders on a powder platform by a powder spreading mechanism. The fusing step is fusing the powders spread on the powder platform by a laser unit. The fusion inspecting step is capturing a post-fusion image of the powder platform by a camera after the fusing step, and transmitting the post-fusion image to a controller to inspect the post-fusion image. The fusion repairing step is determining whether the processing mechanism needs to be driven to repair a surface of the workpiece according to an inspection result of the post-fusion image by the controller.

In one embodiment of the present disclosure, the fusion inspecting step comprises a raised area inspecting sub-step of inspecting a raised area of the post-fusion image, and calculating a position and a size of the raised area.

In one embodiment of the present disclosure, a brightness of the raised area is greater than 110% of an average brightness of a layered contour area of the post-fusion image.

In one embodiment of the present disclosure, after the raised area inspecting sub-step, the fusion inspecting step further comprises a raised area processing path sub-step of calculating a raised area processing path according to a predetermined processing path and the position and the size of the raised area.

In one embodiment of the present disclosure, the surface of the workpiece is processed according to the raised area processing path by cutting tools of the processing mechanism in the fusion repairing step.

In one embodiment of the present disclosure, the fusion inspecting step comprises a depressed area inspecting sub-step of inspecting a depressed area of the post-fusion image, and calculating a position and a size of the depressed area.

In one embodiment of the present disclosure, a brightness of the depressed area is less than 90% of an average brightness of a layered contour area of the post-fusion image.

In one embodiment of the present disclosure, after the depressed area inspecting sub-step, the fusion inspecting step further comprises a depressed area processing path sub-step of calculating a depressed area processing path according to a predetermined processing path and the position and the size of the depressed area.

In one embodiment of the present disclosure, the surface of the workpiece is reamed according to the depressed area processing path by cutting tools of the processing mechanism, and cladded by a laser cladding device of the processing mechanism in the fusion repairing step.

In one embodiment of the present disclosure, the inspecting and repairing method further comprises a spread powder inspecting step of capturing a post-spreading image of the powder platform after the powder spreading step, and transmitting the post-spreading image to the controller to inspect the post-spreading image.

In one embodiment of the present disclosure, the spread powder inspecting step comprises: a spread powder inspecting sub-step of inspecting a brightness of a layered area of the post-spreading image; and a warpage inspecting sub-step of inspecting a brightness of a layered contour area of the post-spreading image.

In one embodiment of the present disclosure, the spread powders are determined to be incomplete if a non-powder spreading area of the post-spreading image is greater than 30% of the layered area in the spread powder inspecting sub-step.

In one embodiment of the present disclosure, the workpiece is determined to be warped if a warpage area of the post-spreading image is greater than 10% of the layered contour area in the warpage inspecting sub-step.

In one embodiment of the present disclosure, after the powder spreading step, the inspecting and repairing method further comprises a spread powder repairing step of determining whether the powder spreading mechanism spreads powders or whether a powder spreading defect needs to be overcome according to an inspection result of the post-spreading image by the controller.

To achieve the above objects, the present disclosure provides an inspecting and repairing device of additive manufacturing technology for inspecting and repairing a workpiece formed by the additive manufacturing technology, which comprises a powder bed unit, a repairing unit, and an inspection unit, wherein the powder bed unit includes a powder platform configured to form the workpiece, a powder spreading mechanism disposed on the powder platform and configured to spread powders on the powder platform, and a laser unit disposed above the powder platform and configured to melt the powders. The repairing unit includes a moving mechanism disposed above the powder platform, and a processing mechanism mounted on the moving mechanism and configured to repair a surface of the workpiece. The inspection unit includes a camera disposed above the powder platform and configured to capture an image of the powder platform, and a controller configured to receive the image, and determine whether the powder spreading mechanism needs to spread the powders, whether a powder spreading defect needs to be overcome, or whether the processing mechanism needs to be driven to repair the surface of the workpiece according to the image.

In one embodiment of the present disclosure, the moving mechanism includes a two-dimensional moving platform disposed above the powder platform, and a multi-axis parallel connection machine disposed on the two-dimensional moving platform.

In one embodiment of the present disclosure, the processing mechanism includes cutting tools and a laser cladding device, the cutting tools and the laser cladding device are alternatively assembled on the multi-axis parallel connection machine.

In one embodiment of the present disclosure, the inspection unit further includes a laser contour sensor assembled on the multi-axis parallel connection machine and configured to sense a contour of the powder platform.

As described above, the post-spreading image and the post-fusion image are captured by the camera. The controller inspects the post-spreading image and the post-fusion image, determines whether any type of defects exists, and identifies various types of defects. For example, state of spreading powders is incomplete, warped state, raised state, and depressed state. Finally, the controller determines whether the powder spreading mechanism needs to spread the powders, whether the powder spreading defect needs to be overcome, or whether the processing mechanism needs to be driven to repair the surface of the workpiece. Thus, the yield rate of the workpiece can be increased, the processing time can be reduced, and the quality of the workpiece can be improved.

DETAILED DESCRIPTION OF THE PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

Figure 1:
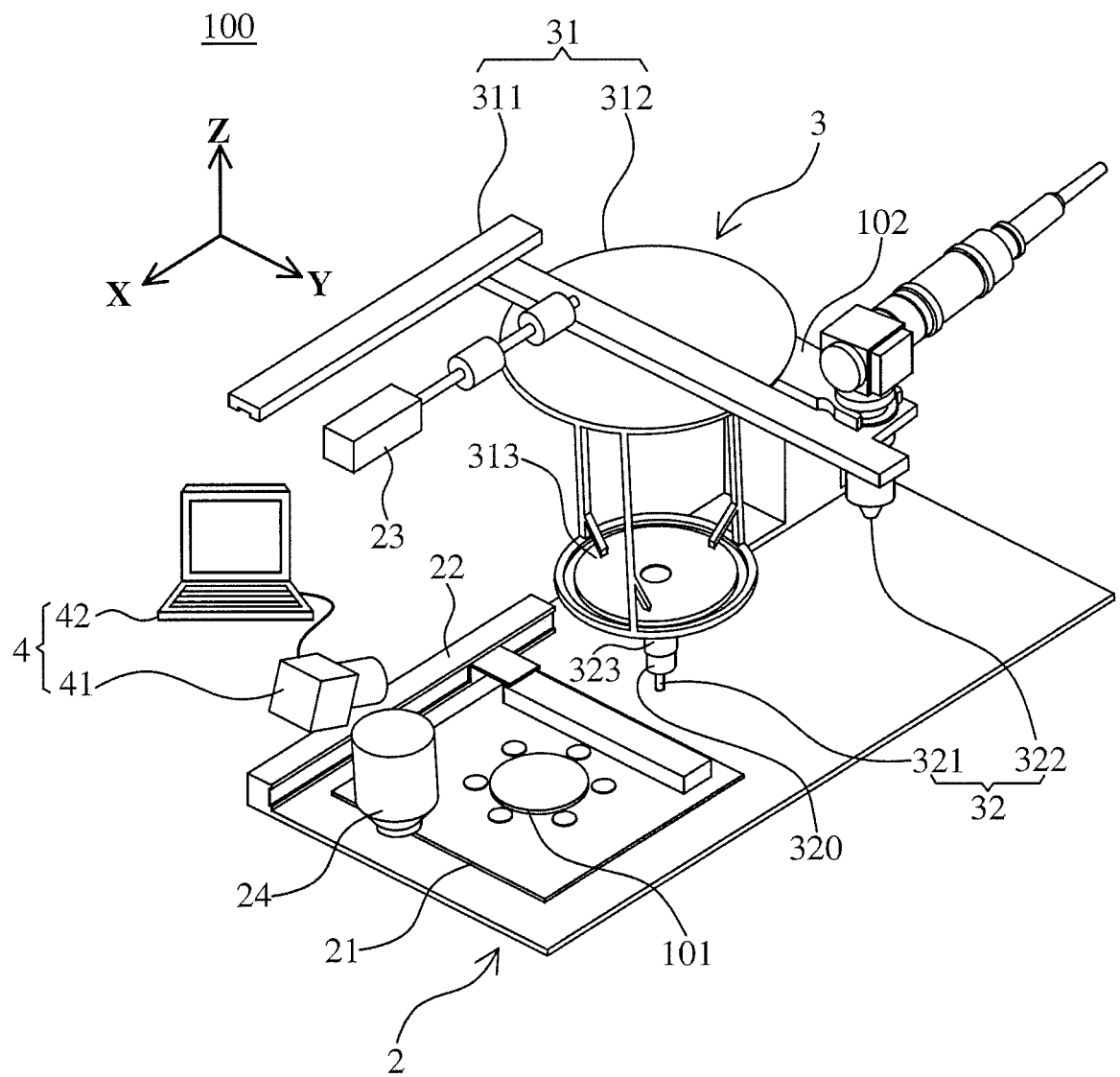
FIG. 1 is a perspective view of a preferred embodiment of an inspecting and repairing device of an additive manufacturing technology of the present disclosure.
Figure 2:
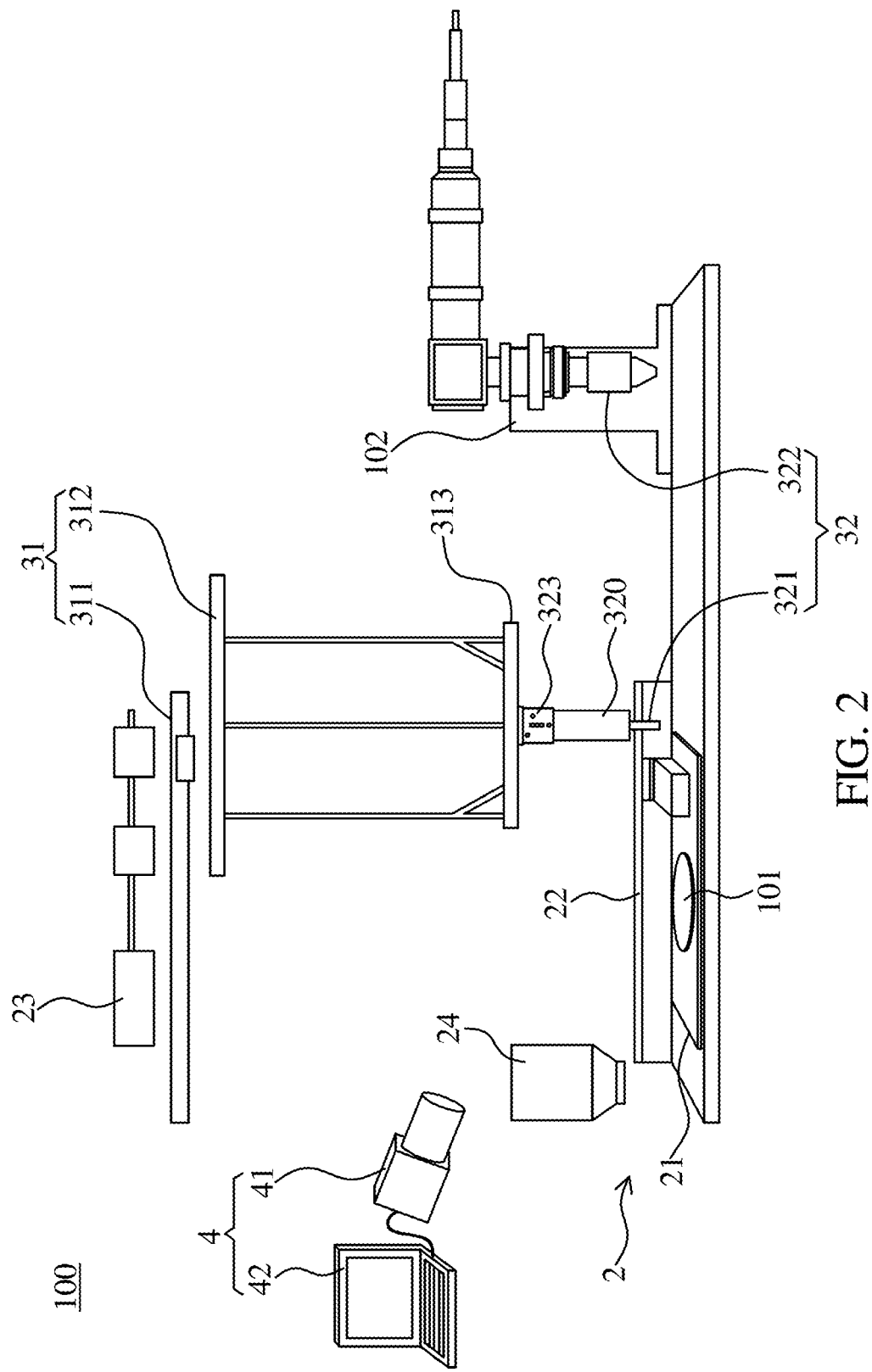
FIG. 2 is a side view of the preferred embodiment of the inspecting and repairing device of the additive manufacturing technology of the present disclosure.

Referring to FIGS. 1 and 2, a preferred embodiment of an inspecting and repairing device of an additive manufacturing technology of the present disclosure is provided. The inspecting and repairing device 100 is configured to inspect and repair defects of a workpiece 101 formed by the additive manufacturing technology. For example, a state of spreading powders is incomplete, a workpiece is warped, a melted surface is raised, and a melted surface is depressed, wherein the inspecting and repairing device 100 comprises a powder bed unit 2, a repairing unit 3, and an inspection unit 4. The detailed structure of each component, assembly relationships, and principles of operation in the present disclosure will be described in detail hereinafter.

Referring to FIGS. 1 and 2, the powder bed unit 2 includes a powder platform 21, a powder spreading mechanism 22, a laser unit 23, and a powder feeder 24, wherein the powder platform 21 is configured to form the workpiece 101; the powder spreading mechanism 22 is disposed on the powder platform 21 and configured to spread powders on the powder platform 21; the laser unit 23 is disposed above the powder platform 21 and configured to melt the powders for forming the workpiece 101; the power feeder 24 is disposed above the powder platform 21 and configured to store powders and feed powders to the powder spreading mechanism 22 for spreading powders.

Referring to FIGS. 1 and 2, the repairing unit 3 includes a moving mechanism 31 and a processing mechanism 32 mounted on the moving mechanism 31 and configured to repair a surface of the workpiece 101, wherein the moving mechanism 31 includes a two-dimensional moving platform 311 and a multi-axis parallel connection machine 312. The two-dimensional moving platform 311 is disposed above the powder platform 21, and the multi-axis parallel connection machine 312 is disposed on the two-dimensional moving platform 311. The multi-axis parallel connection machine 312 can be driven by the two-dimensional moving platform 311 to move along X-axis direction or Y-axis direction. In addition, the processing mechanism 32 includes cutting tools 321 and a laser cladding device 322, wherein the cutting tools 321 are placed in a tool box 102, and mounted on a replacement joint 323 through a spindle 320, wherein the replacement joint 323 is disposed on a bottom of a moving base 313 of the multi-axis parallel connection machine 312. Furthermore, the laser cladding device 322 is also mounted on the replacement joint 323 so that the cutting tools 321 and the laser cladding device 322 are alternatively assembled on the multi-axis parallel connection machine 312. In the embodiment, the multi-axis parallel connection machine 312 is a 3-axis parallel connection machine or a 5-axis parallel connection machine, and is configured to control the moving base 313 to move along a 3-axis direction or a 5-axis direction so that the cutting tools 321 and the laser cladding device 322 can process in any area of the surface of the workpiece 101.

Referring to FIGS. 1 and 2, the inspection unit 4 includes a camera 41 and a controller 42, wherein the camera 41 is disposed above the powder platform 21 and configured to capture an image of the powder platform 21; the controller 42 configured to receive the image, and determine whether the powder spreading mechanism 22 needs to spread the powders, whether a powder spreading defect needs to be overcome, or whether the processing mechanism 32 needs to be driven to repair the surface of the workpiece 101 according to the image.

According to the described structure, during the inspection of spreading powders, the powder spreading mechanism 22 is fed powders through the power feeder 24, and the powder spreading mechanism 22 spreads powders on the powder platform 21. The camera 41 captures a post-spreading image of the powder platform 21, and transmits the post-spreading image to the controller 42 to inspect the post-spreading image for obtaining the state of spreading powders on the powder platform 21 and the warped state of the workpiece 101. The controller 42 determines whether the powder spreading mechanism 22 needs to spread the powders, or whether a powder spreading defect needs to be overcome. In addition, during the inspection of fusion, the powders on the powder platform 21 are melted by the laser unit 23 so that the powders are fused on the workpiece 101. The camera 41 captures a post-fusion image of the powder platform 21, and transmits the post-fusion image to the controller 42 to inspect the post-fusion image for obtaining a raised state and a depressed state of the surface of the workpiece 101. The controller 42 determines whether a processing mechanism 32 needs to be driven to repair the surface of the workpiece 101 according to an inspection result of the post-fusion image.

Figure 3:
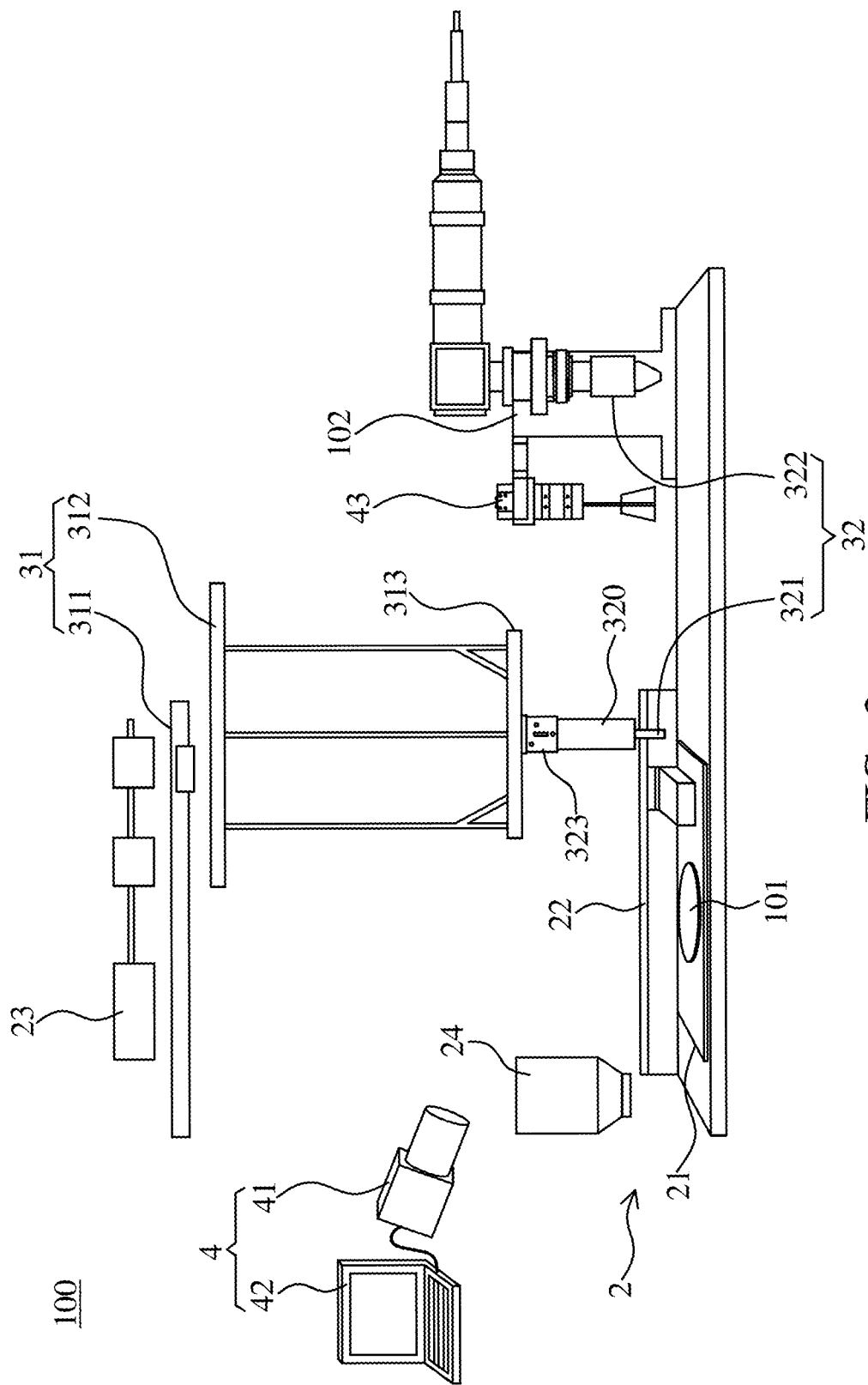
FIG. 3 is a side view of another preferred embodiment of the inspecting and repairing device of the additive manufacturing technology of the present disclosure.

Referring to FIG. 3, another preferred embodiment of the inspecting and repairing device is provided, wherein the inspection unit 4 further includes a laser contour sensor 43, the laser contour sensor 43 is also assembled on the multi-axis parallel connection machine 323 and configured to sense a contour of the powder platform 21, and a raised state and a depressed are inspected according to the contour for determining whether the processing mechanism 32 needs to be driven to repair the surface of the workpiece 101. It should be noted that the inspection unit 4 can solely use the camera 41 to inspect, such as a Charge-coupled Device (CCD), and also can use the camera 41 and the laser contour sensor 43 together to inspect, but it is not limited thereto.

As described above, the post-spreading image and the post-fusion image are captured by the camera 41. The controller 42 inspects the post-spreading image and the post-fusion image, determines whether any type of defects exists, and identifies various types of defects. For example, the state of spreading powders is incomplete, a warped state, raised state, and a depressed state. Finally, the controller 42 determines whether the powder spreading mechanism 22 needs to spread the powders, whether the powder spreading defect needs to be overcome, or whether the processing mechanism 32 needs to be driven to repair the surface of the workpiece 101. Thus, the yield rate of the workpiece 101 can be increased, the processing time can be reduced, and the quality of the workpiece 101 can be improved.

Figure 4:
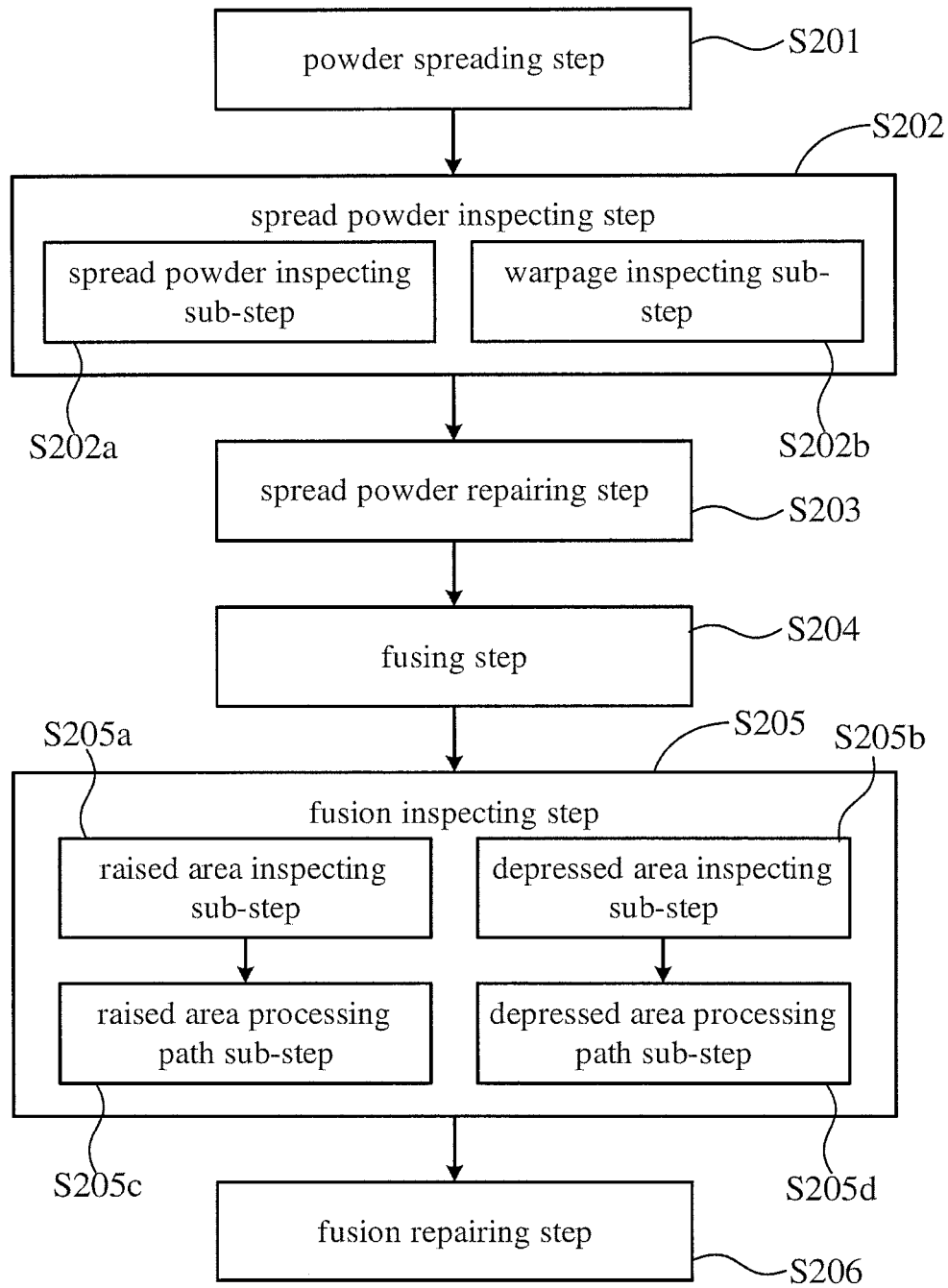
FIG. 4 is a flow chart of a preferred embodiment of an inspecting and repairing method of an additive manufacturing technology of the present disclosure.

Referring to FIG. 4 with reference to FIGS. 1 and 2, a preferred embodiment of an inspecting and repairing method of an additive manufacturing technology of the present disclosure is provided, and inspects and repairs defects of a workpiece 101 formed by the additive manufacturing technology by using said inspecting and repairing device 100 of the additive manufacturing technology. The inspecting and repairing method comprises a powder spreading step S201, a spread powder inspecting step S202, a spread powder repairing step S203, a fusing step S204, a fusion inspecting step S205, and a fusion repairing step S206.

Referring to FIG. 4 with reference to FIGS. 1 and 2, in the powder spreading step S201, a powder feeder 24 is configured to feed powders to a powder spreading mechanism 22, and the powder spreading mechanism 22 spreads powders to a powder platform 21.

Figure 5:
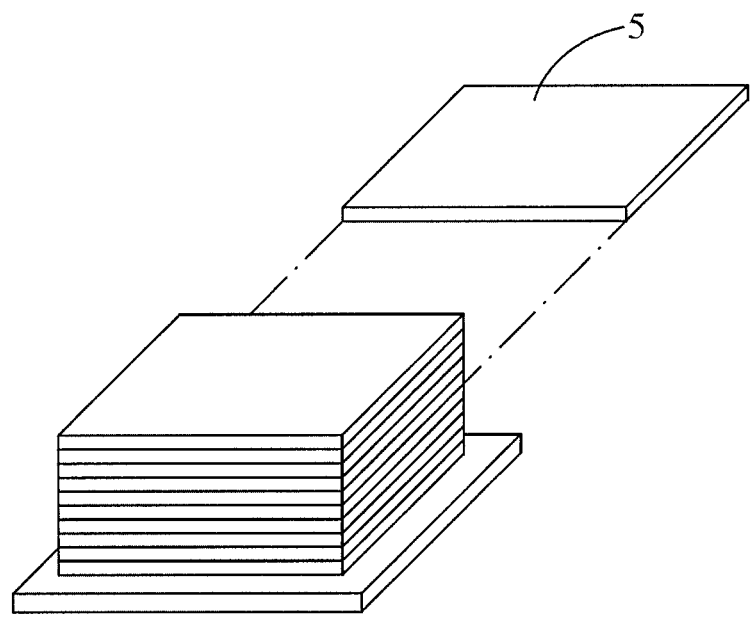
FIG. 5 is a schematic view of image cutting layers in the preferred embodiment of the inspecting and repairing method of the additive manufacturing technology of the present disclosure.
Figure 6:
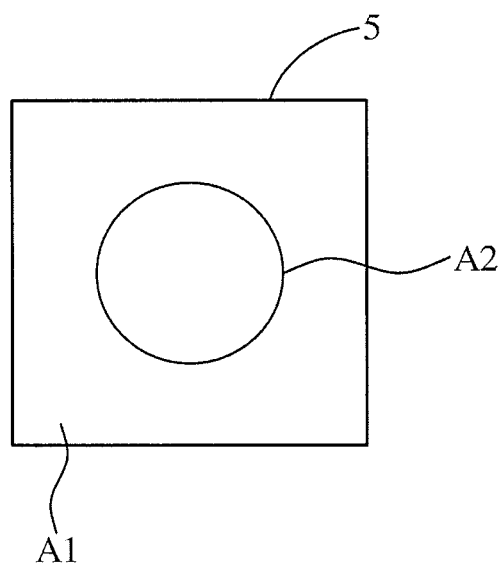
FIG. 6 is a schematic view of a layered area and a layered contour area defined in the preferred embodiment of the inspecting and repairing method of the additive manufacturing technology of the present disclosure.

It should be noted that a plurality of image cutting layers 5 are stacked to form a stereoscopic image as shown in FIGS. 5 and 6. The workpiece 101 is laminated and formed according the image cutting layers 5, wherein each of the image cutting layers 5 has a layered area A1 and a layered contour area A2.

Referring to FIG. 4 with reference to FIGS. 1 and 2, in the spread powder inspecting step S202, a camera 41 is configured to capture a post-fusion image of the powder platform 21, and transmit the post-fusion image to a controller 42 to inspect the post-fusion image. Specifically, the spread powder inspecting step S202 includes a spread powder inspecting sub-step S202a and a warpage inspecting sub-step S202b. The spread powder inspecting sub-step S202a is inspecting a brightness of the layered area A1 of the post-spreading image for obtaining the state of spreading powders on the powder platform 21, a size of the layered area A1 corresponds to a seize of the powder platform 21. In addition, the warpage inspecting sub-step S202b is inspecting a brightness of the layered contour area A2 of the post-spreading image for obtaining warped state, wherein a size of the layered contour area A2 corresponds to a size of a section of the workpiece 101.

Referring to FIG. 4 with reference to FIGS. 1 and 2, in the spread powder repairing step S203, the controller 42 determines whether the powder spreading mechanism 22 needs to spread the powders, or whether a powder spreading defect needs to be overcome. For example, state of spreading powders on the powder platform 21 is incomplete, and determined the powder spreading mechanism 22 stops spreading the powders; the workpiece 101 is in a warped state, and determined to overcome the powder spreading defect.

Referring to FIG. 4 with reference to FIGS. 1 and 2, in the fusing step S204, a laser unit 23 is configured to melt the powders spread on the powder platform 21 for fusing the powders on the workpiece 101.

Referring to FIG. 4 with reference to FIGS. 1 and 2, in the fusion inspecting step S205, the camera 41 is configured to capture a post-fusion image of the powder platform 21 after the fusing step S204, and transmit the post-fusion image to the controller 42 to inspect the post-fusion image, wherein the fusion inspecting step S205 includes a raised area inspecting sub-step S205a, a depressed area inspecting sub-step S205b, a raised area processing path sub-step S205c, and a depressed area processing path sub-step S205d.

Figure 7:
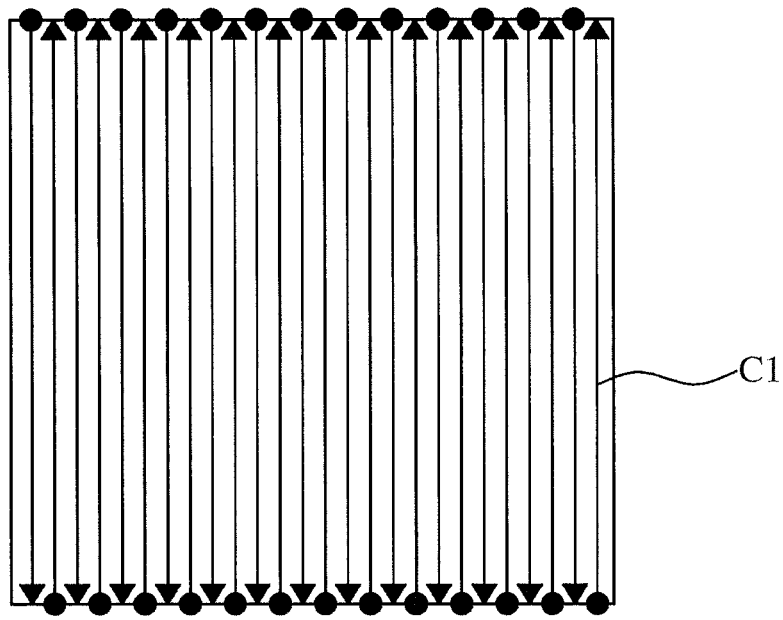
FIG. 7 is a schematic view of a predetermined processing path in the preferred embodiment of the inspecting and repairing method of the additive manufacturing technology of the present disclosure.
Figure 8:
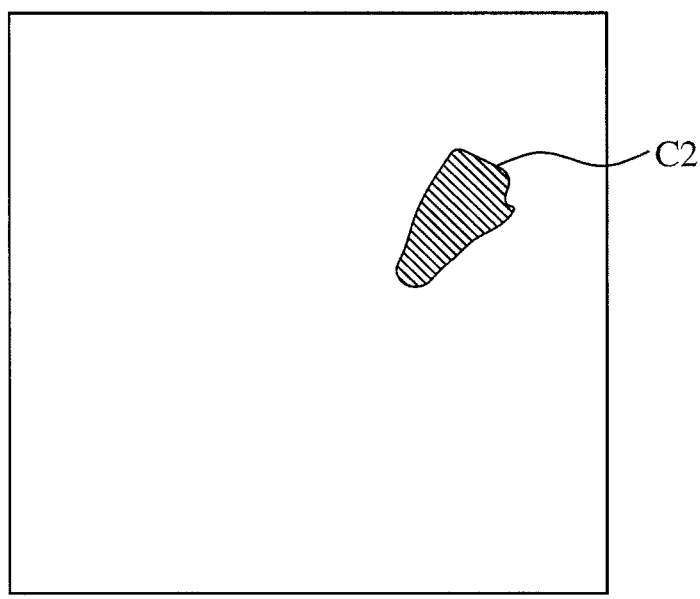
FIG. 8 is a schematic view of a processing area in the preferred embodiment of the inspecting and repairing method of the additive manufacturing technology of the present disclosure.

Specifically, the raised area inspecting sub-step S205a is inspecting a raised area of the post-fusion image, and calculating a position and a size of the raised area for obtaining raised state of a surface of the workpiece 101. In the embodiment, a brightness of the raised area is greater than 110% of an average brightness of the layered contour area A2 of the post-fusion image, and the raised area processing path sub-step S205c is implemented after the raised area inspecting sub-step S205a. As shown in FIGS. 7 and 8, a raised area processing path is calculated according to a predetermined processing path C1 and a position and a size of a processing area C2 (raised area).

Furthermore, the depressed area inspecting sub-step S205b is inspecting a depressed area of the post-fusion image, and calculating a position and a size of the depressed area for obtaining depressed state of the surface of the workpiece 101, wherein a brightness of the depressed area is less than 90% of an average brightness of the layered contour area A2 of the post-fusion image, and the depressed area processing path sub-step S205 is implemented after the depressed area inspecting sub-step S205b. As shown in FIGS. 7 and 8, a depressed area processing path is calculated according to a predetermined processing path C1 and a position and a size of a processing area C2 (depressed area).

Referring to FIG. 3, a laser contour sensor 43 is also configured to sense a contour of the powder platform 21, calculate the position and the size of the raised area, and calculate the position and the size of the depressed area, wherein a height of the raised area is greater than a thickness of two layer of spread powders, and a depth of the depressed area is greater than a thickness of two layer of spread powders.

Referring to FIG. 3 with reference to FIGS. 1 and 2, in the fusion repairing step S206, the controller 42 is configured to determine whether a processing mechanism 32 needs to be driven to repair the surface of the workpiece 101 according to an inspection result of the post-fusion image, such as a raised state or a depressed state of the surface of the workpiece 101. In the embodiment, in the fusion repairing step S206, cutting tools 321 of the processing mechanism 32 are configured to ream the surface of the workpiece 101, and a laser cladding device 322 of the processing mechanism 32 is configured to clad the surface of the workpiece 101.

As described above, the post-spreading image and the post-fusion image are captured by the camera 41. The controller 42 inspects the post-spreading image and the post-fusion image, determines whether any type of defects exists, and identifies various types of defects. For example, the state of spreading powders is incomplete, a warped state, a raised state, and a depressed state. Finally, the controller 42 determines whether the powder spreading mechanism 22 needs to spread the powders, whether the powder spreading defect needs to be overcome, or whether the processing mechanism 32 needs to be driven to repair the surface of the workpiece 101. Thus, the yield rate of the workpiece 101 can be increased, the processing time can be reduced, and the quality of the workpiece 101 can be improved.

The present disclosure has been described with preferred embodiments thereof and it is understood that many changes and modifications to the described embodiments can be carried out without departing from the scope and the spirit of the disclosure that is intended to be limited only by the appended claims.

What is claimed is:

1. An inspecting and repairing method of an additive manufacturing technology for inspecting and repairing a workpiece formed by the additive manufacturing technology, comprising:
   a powder spreading step of spreading powders on a powder platform by a powder spreading mechanism;
   a fusing step of fusing the powders spread on the powder platform by a laser unit;
   a fusion inspecting step of capturing a post-fusion image of the powder platform by a camera after the fusing step, and transmitting the post-fusion image to a controller to inspect the post-fusion image; and
   a fusion repairing step of determining whether the processing mechanism needs to be driven to repair a surface of the workpiece according to an inspection result of the post-fusion image by the controller;
   wherein the fusion inspecting step comprises a raised area inspecting sub-step of inspecting a raised area of the post-fusion image, and calculating a position and a size of the raised area, a brightness of the raised area is greater than 110% of an average brightness of a layered contour area of the post-fusion image;
   wherein the fusion inspecting step comprises a depressed area inspecting sub-step of inspecting a depressed area of the post-fusion image, and calculating a position and a size of the depressed area, a brightness of the depressed area is less than 90% of an average brightness of a layered contour area of the post-fusion image.

2. The inspecting and repairing method according to claim 1, wherein after the raised area inspecting sub-step, the fusion inspecting step further comprises a raised area processing path sub-step of calculating a raised area processing path according to a predetermined processing path and the position and the size of the raised area.

3. The inspecting and repairing method according to claim 2, wherein the surface of the workpiece is processed according to the raised area processing path by cutting tools of the processing mechanism in the fusion repairing step.

4. The inspecting and repairing method according to claim 1, wherein after the depressed area inspecting sub-step, the fusion inspecting step further comprises a depressed area processing path sub-step of calculating a depressed area processing path according to a predetermined processing path and the position and the size of the depressed area.

5. The inspecting and repairing method according to claim 4, wherein the surface of the workpiece is reamed according to the depressed area processing path by cutting tools of the processing mechanism, and cladded by a laser cladding device of the processing mechanism in the fusion repairing step.

6. The inspecting and repairing method according to claim 1, wherein the inspecting and repairing method further comprises a spread powder inspecting step of capturing a post-spreading image of the powder platform after the powder spreading step, and transmitting the post-spreading image to the controller to inspect the post-spreading image.

7. The inspecting and repairing method according to claim 6, wherein the spread powder inspecting step comprises:
   a spread powder inspecting sub-step of inspecting a brightness of a layered area of the post-spreading image; and
   a warpage inspecting sub-step of inspecting a brightness of a layered contour area of the post-spreading image.

8. The inspecting and repairing method according to claim 7, wherein the spread powders are determined to be incomplete if a non-powder spreading area of the post-spreading image is greater than 30% of the layered area in the spread powder inspecting sub-step.

9. The inspecting and repairing method according to claim 7, wherein the workpiece is determined to be warped if a warpage area of the post-spreading image is greater than 10% of the layered contour area in the warpage inspecting sub-step.

10. The inspecting and repairing method according to claim 6, wherein after the powder spreading step, the inspecting and repairing method further comprises a spread powder repairing step of determining whether the powder spreading mechanism spreads powders or whether a powder spreading defect needs to be overcome according to an inspection result of the post-spreading image by the controller.

\* \* \* \* \*